United States Patent [19]
Buecherl

[11] 3,737,813
[45] June 5, 1973

[54] TRANSMISSION SEPARATION FILTER NETWORK FOR ELECTRIC OSCILLATIONS

[75] Inventor: Erwin Buecherl, Munich, Germany

[73] Assignee: Siemens Aktiengesellschaft, Berlin & Munich, Germany

[22] Filed: Mar. 20, 1972

[21] Appl. No.: 236,423

[30] Foreign Application Priority Data

Mar. 22, 1971 Germany ....................P 21 13 761.1

[52] U.S. Cl. ......................333/70 R, 333/8, 333/29, 333/77

[51] Int. Cl. ..........................H03h 7/04, H04b 31/00

[58] Field of Search ........................333/70 R, 11, 24, 333/6, 8, 29, 72, 77

[56] References Cited

UNITED STATES PATENTS 3,009,120 11/1961 Robson ................................333/72

FOREIGN PATENTS OR APPLICATIONS 1,086,825 8/1960 Germany..................................33/7

217,842 12/1956 Australia ...............................333/11

*Primary Examiner*—Rudolph V. Rolinec
*Assistant Examiner*—Marvin Nussbaum
*Attorney*—Benjamin H. Sherman, Charles F. Meroni, J. Arthur Gross et al.

[57] ABSTRACT

A transmission separation filter designed as an all pass filter network which comprises two equal frequency filters whose partial filters have reciprocal characteristic functions and are symmetrically connected with respect to the input and output of the transmission separation filter. Two-port circuits are connected between respectively equal partial filters and may be embodied as transformers, reactance networks, distortion correctors or amplifiers, and are dimensioned such that the electrical properties of the entire network coincide with the electrical properties of the interconnected two-port circuits in the partial frequency ranges, with the exception of an additional phase. The partial filters have uneven characteristic functions and a 180° phase shifter is provided in one filter branch and the two-port circuit of the same branch is the dual of the respective two-port circuit interconnected in the other filter branch.

5 Claims, 5 Drawing Figures

Patented June 5, 1973 3,737,813

4 Sheets-Sheet 1

Patented June 5, 1973 3,737,813

4 Sheets-Sheet 3

Patented June 5, 1973 3,737,813

4 Sheets-Sheet 4

TRANSMISSION SEPARATION FILTER NETWORK FOR ELECTRIC OSCILLATIONS

DESCRIPTION

This invention relates to a transmission separation filter network for electric oscillations, and in particular to a transmission separation filter network which is designed as an all pass filter network and which comprises two equal frequency filters whose partial filters have mutually reciprocal characteristic functions and are symmetrically connected in the branches of the filter network. Two-port circuits, such as transformers, reactance networks, distortion correctors or amplifiers, are connected between two similar partial filters and are designed such that the electrical properties of the entire transmission separation filter network coincides with the electrical properties of the interconnected two-port circuits which are provided in the partial frequency ranges, with the exception of an additional phase. In information transmission techniques, for example during the construction of broad band carrier frequency systems, it is often required to provide transmission on relatively broad frequency bands. However, the circuits which are utilized such as active two-port circuits, transformers and other passive two-port circuits, have limited band widths due to their structure so that, when wide frequency bands are transmitted, intolerably large deviations from a desired behavior may occur, for example, intolerable damping distortions may arise. In order to avoid these difficulties, a transmission separating filter network has been suggested which proceeds from an all pass filter network which is known from the German Letters Pat. No. 1,368,289.

For this purpose, additional two-port circuits are added in the individual filter branches of the prior art all pass network, and it is essential, among other things, that all partial filters have an even characteristic function. These two-port circuits are designed in such a way that the electrical properties of the entire transmission separation filter network coincide with the electrical properties of the interconnected two-port circuits in the partial frequency ranges, with the exception of an additional phase. Such circuits have proven advantageous in practice since a gap-free and phase correct interrelationship of the individual partial bands becomes possible at the output of the transmission separation filter network.

However, it proves that a limitation arises during circuit design, since only partial filters with a flat characteristic function can be utilized for the construction of the symmetrically connected partial transmission separation filters.

The object of the present invention is, therefore, to eliminate these limitations, and transmission separation filter networks wherein the partial filters may also comprise an uneven characteristic function are to be employed which results in a higher degree of flexibility during selection of the circuit suited for the respective technical problem.

The foregoing object is realized in circuits of the type initially described, according to the present invention, in such a way that the partial filters have an uneven characteristic function and that a 180° phase shifter is provided in one of the filter branches. The two-port circuit which is interconnected in this filter branch is constructed as a dual of the corresponding two-port circuit interconnected in the other filter branch.

Other objects, features, and advantages of the invention, its organization, construction and operation will be best understoof from the following detailed description taken in conjunction with the accompanying drawings, in which.

Figure 1:
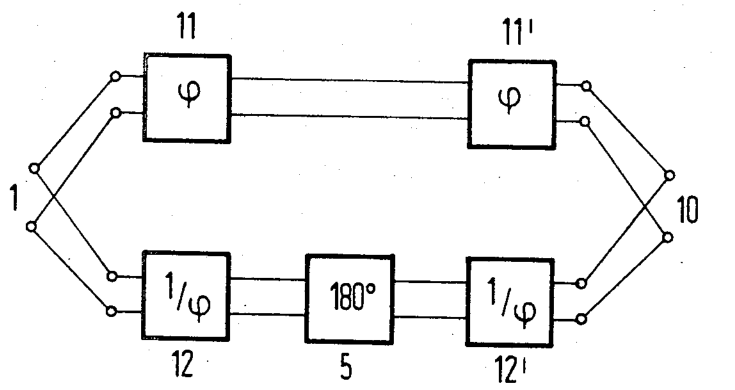
FIG. 1 is a schematic block diagram of an all pass filter network known from the prior art.

For a better understanding of the present invention, a transmission separation filter network, according to the prior art, has been illustrated in FIG. 1 in block diagram form, the network being designed as a parallel filter. The individual partial filters are denoted by 11 and 11' or by 12 and 12', respectively. The input and output of the all pass network are respectively referenced with the numerals 1 and 10. In order to form an all pass network, two equally designed partial transmission separation filters are symmetrically chain-connected, whereby the characteristic functions of the individual partial filters are reciprocal with respect to each other. Therefore, the partial filters are reciprocal with respect to each other. Therefore, the partial filters 11 and 11' of the circuit have the characteristic function $\phi$, and the partial filters 12 and 12' have the characteristic function $1/\phi$, i.e. the pass range of the partial filters 11 and 11' coincide with respect to frequency with the stop band of the partial filters 12 and 12'. It is therefore essential that the individual partial filters have uneven functions as their characteristic functions. As it has been shown in the prior art circuit, such a circuit can be supplemented to become a complete all pass network when a 180° phase shifter is provided in one of the two filter branches; therefore, the filter branch containing the partial filters 12 and 12' have been supplemented with such a phase shifter 5. If, therefore, the so-called strict filters are employed for the individual partial transmission separation filters, i.e. for the filters formed of the partial filters 11' and 12', the behavior of strict all pass network will result between the terminals 1 and 10. Thereby, strict partial transmission separation filters are such filters wherein the characteristic functions of the associated partial filters are exactly reciprocal with respect to each other. A series of circuit problems, however, can be solved through the use of so-called non-strict filters, i.e. the application of filters wherein the partial filters, at least in their overlapping range, have only approximate reciprocal characteristic functions with respect to each other.

The 180° phase shifter 5 can be realized by means of a transformer having a transformation ratio 1:—1, when nonsymmetrical circuits, with respect to ground are utilized. If symmetrical circuits with respect to ground are employed, the 180° phase shifter 5 can be designed as a simple line crossing.

Figure 2:
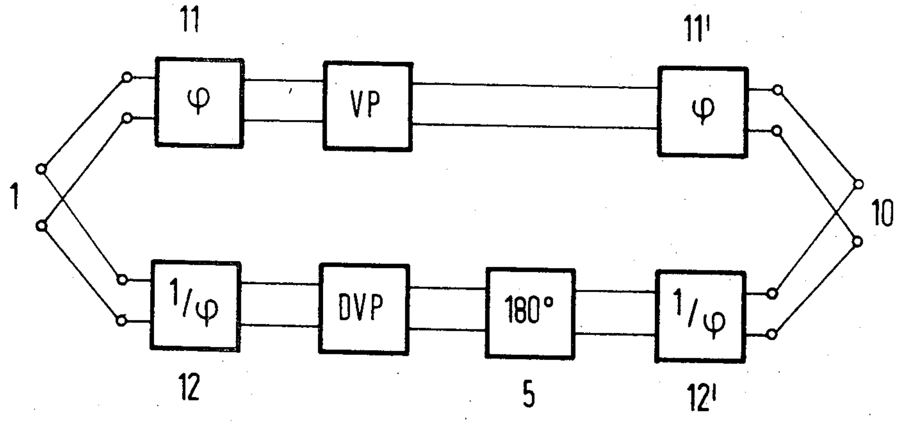
FIG. 2 is a schematic block diagram of a transmission separation filter network according to the present invention.

FIG. 2 illustrates a circuit according to the present invention wherein two-port circuits are interconnected in the individual filter branches, along with the phase shifter 5, in the circuit according to FIG. 1. The two-port circuit VP is positioned and connected in a filter branch between the partial filters 11 and 11', and the dual two-port circuit DVP is positioned and connected in the other filter branch. The 180° phase shifter 5 must therefore be provided in the filter branch containing the two-port circuit DVP, and the two-port circuits VP and DVP are dimensioned in such a way that the electrical properties of the entire transmission separation filter network between the terminals 1 and 10 coincide with the electrical properties of the interconnected two-port circuits VP,DVP, in the given partial frequency ranges, except for an additional phase. Therefore, it can be provided that a broad frequency band can be split into two partial bands with the help of the transmission separation filter network so that the individual partial bands can first of all be separately processed, and then be combined again without gaps. Transformers, reactance networks such as quartz band suppressors, distortion correctors or amplifiers can be employed as the two-port circuits VP and DVP. The transmission factor S of the circuit according to FIG. 2 is therefore sufficient, under the simplifying precondition that the two-port circuits VP and DVP have the same transmission properties, exactly corresponding to the condition:

$$S = e^{a_b} \cdot e^{jb} = e^{a_b} e^{j(b_b + b)}$$

wherein $b$ is the phase of the transmission separation filter network according to FIG. 1 (additional phase), $b_b$ is the phase and $a_b$ is the operational damping of the connected two-port circuits VP and DVP.

Figure 3:
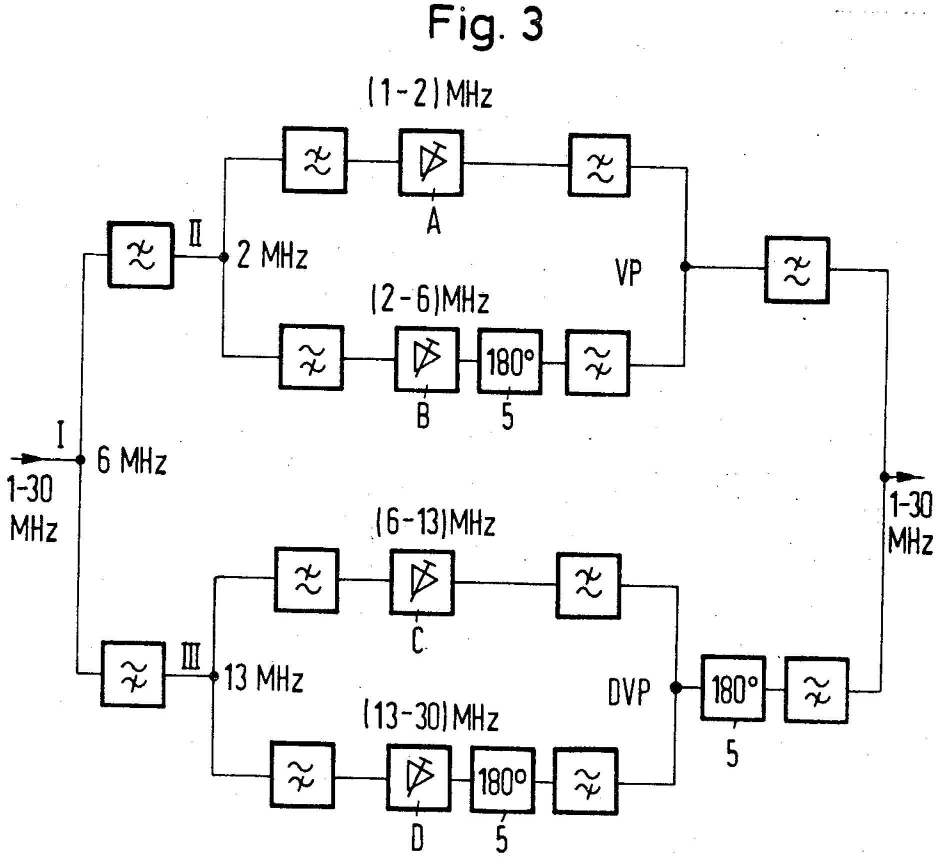
FIG. 3 is a schematic circuit diagram of a further development of the apparatus of FIG. 2, wherein four partial paths are illustrated.

In a further development of the invention, a change of the transmission separation filter network according to FIG. 2 has been illustrated in FIG. 3. Thereby, the interconnected two-port circuits VP and DVP themselves are designed as transmission filter networks according to FIG. 2, in order to form a filter network with more than two partial paths. The short wave frequency band of 1–30 MHz, which is, for example, received by an antenna for distress-at-sea radio service, is to be subdivided into four geometrically-staged frequency bands by means of the filter field illustrated in FIG. 3. It must be possible to regulate the level of these four bands independently of each other by means of the four linear amplifiers which are equal in this particular embodiment and which are connected between the filters, at a certain value, such as 20 dB. Therefore, it is possible to selectively dampen strong transmitters or other transmissions which occur in one of these bands, which avoids an over driving of the subsequent receivers. The other bands may therefore be received with full sensitivity aNd without disturbence. Essential requirements of the filter field now consist in that damping and phase proceed steadily and monotonously, independent from the adjustment of the amplifier, in particular in the range of the overlapping of the three filters I, II and III with the overlapping frequencies $f_I \approx 6$ MHz, $f_{II} \approx 2$ MHz, and $f_{III} \approx 13$ MHz. The four frequency bands must be connected again at the output of the filter, without gaps and without seams.

This is a typical task for all all-pass networks. The filter field illustrated in FIG. 3 is for example, dimensioned in the following way. The two inner networks VP and DVP are strict all pass networks with interconnected equal two-port circuits, namely the amplifiers A and B or C and D, respectively. If these two inner networks were equal, the entire network, with the exception of the amplifiers, would be a strict all pass network, since all pass networks and reflection-free amplifiers are dual with respect to themselves. Since the two inner networks, however, have different transmission bands, their phases, of course, are also different. In practice, however, it suffices completely when the two phases are only approximately equal in the overlapping range of the filter I between the frequencies $f_{S1}$ and $f_{S2}$ (compare FIG. 3) up to a value of $n \cdot 2\pi$, where $n$ is an integer.

Figure 4:
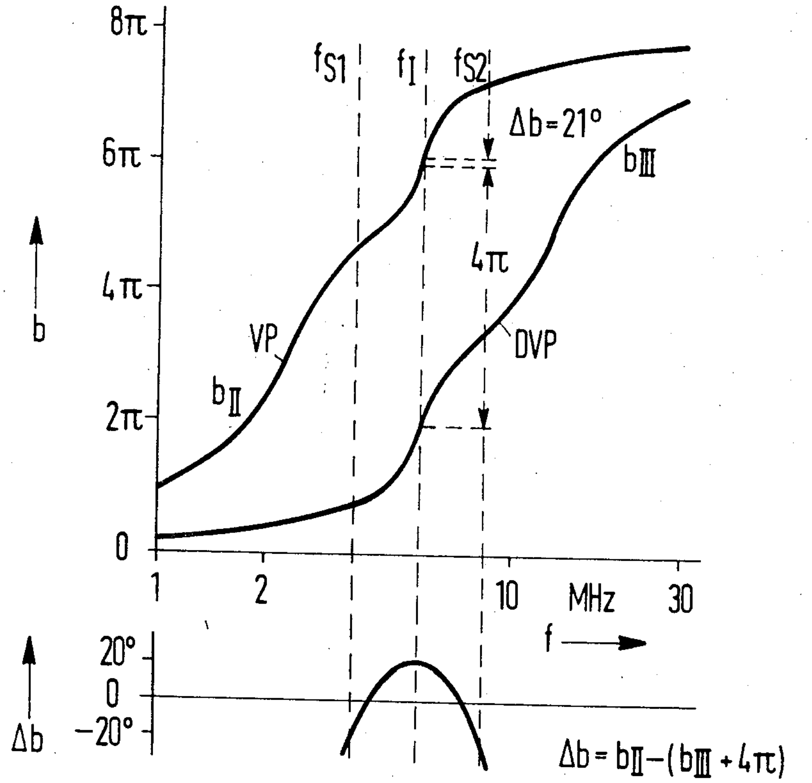
FIG. 4 is a graphical illustration of the phase shape and the phase difference of the interconnected two-port circuits of a circuit according to FIG. 3.

The shape of the two phases $b_{II}$ and $b_{III}$ of the two inner networks VP and DVP, as well as their phase difference $\Delta b$, depending on the frequency $f$, are illustrated in FIG. 4. The remaining effective phase difference in the overlapping range is $$\Delta b = b_{II} - (b_{III} + 4) \geq 21°.$$

Figure 5:
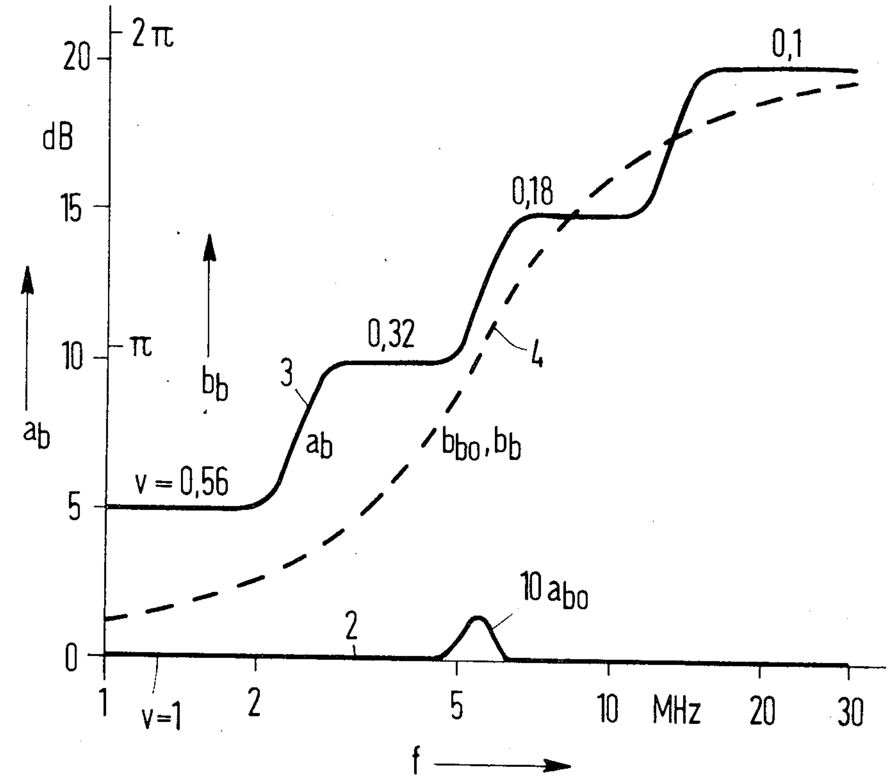
FIG. 5 is a graphical illustration of the damping and phase shape of a circuit according to FIG. 3.

This small phase error effects a damping distortion $a_{bo}$ of about 17 mNp, at about 6 MHz, and its path has been illustrated in FIG. 5 exaggerated by a multiple of 10, and it is completely of no interest for this application.

The curves 2 and 4 of FIG. 5 illustrate the shape of the damping $a_{bo}$ and the phase $b_{bo}$ for the same amplification $v - 1$ of all of the amplifiers A–D. The curves 3 and 4 illustrate the shape of the damping $a_b$ and the phase $b_b$, with different adjustments of the amplifiers, whereby the amplifier A has an amplification of $v = 0.56$, the amplifier B has the amplification $v - 0.32$, the amplifier C has the amplification $v = 0.18$, and, the amplifier D has the amplification $v = 0.1$. As can be seen from FIG. 5, damping and phase extend steadily and monotonously and the phase $b_b - b_{bo}$ is practically independent of amplifier adjustment.

Analogously to the dimentions stated in the aforementioned patent, such filters which have an even characteristic function can be employed as partial filters in the sample embodiment according to FIG. 3. In this case, the 180° networks must be removed and all interconnected two-port circuits must have an equal impedence characteristic, at least in the overlapping ranges.

Although I have described my invention by reference to specific illustrations, many changes and modifications of my invention may become apparent to those skilled in the art without departing from the spirit and scope thereof. I therefore intend to to include within the patent warranted hereon all such changes and modifications as may reasonably and properly be included within the scope of my contribution to the art.

I claim:

1. In a transmission separation filter network of the type which is designed as an all pass filter and which includes two equal frequency filters which are chain connected symmetrically in branches and which have reciprocal characteristic functions, and wherein two-port circuits are connected between two respectively equal partial filters and have electrical properties which coincide with the electrical properties of the entire filter net work given for the partial frequency ranges, with the exception of an additional phase, the improvement comprising: the provision of said partial filters as filters having uneven characteristics, a 180° phase shifter interposed in one branch of said filter network, and the provision of the two-port circuit of said one branch as the dual of the two-port circuit of the other branch.

2. A transmission separation filter network improvement according to claim 1, wherein said partial filter circuits are symmetrical with respect to ground, and said 180° phase shifter is a crossed line.

3. The transmission separation filter network improvement according to claim 1, wherein said 180° phase shifter includes a transformer having a 1:—1 transformation ratio.

4. A transformation separation filter network improvement wherein said two-port circuits each include the structure set forth in claim 1 to provide a filter network with more than two paths.

5. A transmission separation filter network improvement according to claim 4 wherein said partial filters have even characteristic functions.

* * * * *